US010028156B2

(12) United States Patent
HomChaudhuri et al.

(10) Patent No.: US 10,028,156 B2
(45) Date of Patent: Jul. 17, 2018

(54) CONGESTION BASED ROAMING IN A WIRELESS LOCAL AREA NETWORK

(71) Applicant: QUALCOMM Incorporated, San Diego, CA (US)

(72) Inventors: Sandip HomChaudhuri, San Jose, CA (US); Xiaolong Huang, Morgan Hill, CA (US); Pradeep Kumar Yenganti, Cupertino, CA (US); Srinivas Katar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/943,659

(22) Filed: Nov. 17, 2015

(65) Prior Publication Data

US 2017/0013493 A1 Jan. 12, 2017

Related U.S. Application Data

(60) Provisional application No. 62/190,634, filed on Jul. 9, 2015.

(51) Int. Cl.
*H04W 28/02* (2009.01)
*H04W 24/08* (2009.01)
*H04W 72/04* (2009.01)
*H04W 36/08* (2009.01)
(Continued)

(52) U.S. Cl.
CPC ............. *H04W 24/08* (2013.01); *H04L 47/12* (2013.01); *H04W 28/0284* (2013.01);
(Continued)

(58) Field of Classification Search
CPC . H04W 24/08; H04W 28/0284; H04W 36/08; H04W 36/30; H04W 40/12;
(Continued)

(56) References Cited

U.S. PATENT DOCUMENTS 8,635,335 B2 1/2014 Raleigh et al.
8,805,360 B2 8/2014 Nagaraj
(Continued)

FOREIGN PATENT DOCUMENTS

EP 1641185 A1 3/2006

OTHER PUBLICATIONS

ISA/EP, International Search Report and Written Opinion of the International Searching Authority, Int'l Application No. PCT/US2016/040830, dated Sep. 29, 2016, European Patent Office, Rijswijk, NL, 14 pgs.

*Primary Examiner* — Luat Phung
(74) *Attorney, Agent, or Firm* — Holland & Hart LLP/Qualcomm

(57) ABSTRACT

Methods, systems, and devices are described for wireless communications. A device may utilize enhanced roaming techniques to identify a candidate channel for roaming. In one example, a device determines whether a candidate channel is congested by calculating a congestion metric associated with traffic over the shared channel. In some examples, the congestion metric is calculated based at least in part on an amount of energy measured over the candidate. For instance, the calculated congestion metric can be an instantaneous congestion level measured during a CCA. The device may then determine whether to roam to the candidate channel based at least in part on the calculated congestion metric.

26 Claims, 8 Drawing Sheets

(51) Int. Cl.
*H04W 36/30* (2009.01)
*H04L 12/801* (2013.01)
*H04W 40/12* (2009.01)
*H04W 36/00* (2009.01)
*H04W 36/22* (2009.01)

(52) U.S. Cl.
CPC ........... *H04W 36/08* (2013.01); *H04W 36/30* (2013.01); *H04W 40/12* (2013.01); *H04W 72/0486* (2013.01); *H04W 36/0083* (2013.01); *H04W 36/22* (2013.01); *Y02D 70/00* (2018.01); *Y02D 70/142* (2018.01); *Y02D 70/22* (2018.01); *Y02D 70/34* (2018.01)

(58) Field of Classification Search
CPC ......... H04W 72/0486; H04W 36/0083; H04W 36/22; H04L 47/12; Y02B 60/50
See application file for complete search history.

(56) References Cited

U.S. PATENT DOCUMENTS

| | | |
|---|---|---|
| 2006/0067226 A1 | 3/2006 | Chandra et al. |
| 2010/0234042 A1* | 9/2010 | Chan ................. H04W 36/0061 455/453 |
| 2011/0216692 A1 | 9/2011 | Lundsgaard et al. |
| 2012/0224483 A1* | 9/2012 | Babiarz ............... H04L 43/0847 370/232 |
| 2014/0213277 A1 | 7/2014 | Jang |
| 2014/0341069 A1 | 11/2014 | Alan |
| 2015/0098392 A1 | 4/2015 | HomChaudhuri et al. |
| 2016/0119812 A1* | 4/2016 | Owan ................. H04W 28/0236 370/230 |
| 2016/0345230 A1* | 11/2016 | Cuevas Ramirez .. H04W 36/14 |

\* cited by examiner

CONGESTION BASED ROAMING IN A WIRELESS LOCAL AREA NETWORK

CROSS REFERENCES

The present Application for Patent claims priority to U.S. Provisional Patent Application No. 62/190,634 by Hom-Chaudhuri et al., entitled "Congestion Based Roaming in a Wireless Local Area Network," filed Jul. 9, 2015, assigned to the assignee hereof, and expressly incorporated by reference herein.

BACKGROUND

Field of the Disclosure

The following relates generally to wireless communication, and more specifically to techniques for congestion based roaming in a Wireless Local Area Network (WLAN).

Description of Related Art

Wireless communications systems are widely deployed to provide various types of communication content such as voice, video, packet data, messaging, broadcast, and so on. These systems are often multiple-access systems capable of supporting communication with multiple users by sharing the available system resources (e.g., time, frequency, and power). WLANs are an example of such systems and are widely deployed and used. Other examples of such multiple-access systems may include code-division multiple access (CDMA) systems, time-division multiple access (TDMA) systems, frequency-division multiple access (FDMA) systems, and orthogonal frequency-division multiple access (OFDMA) systems.

A WLAN, such as a Wi-Fi (IEEE 802.11) network, includes one or more access points (APs). The AP simultaneously supports communications for multiple mobile devices or stations (STAs) over a shared radio frequency spectrum. In certain instances, the WLAN implements contention-based protocols that allow multiple devices (e.g., STAs and APs) to share the same wireless medium (e.g., a channel) without pre-coordination and with minimal interference. However, a large number of devices associated with the network (i.e., a more congested network) often leads to an increase in the probability of collisions between device transmissions, thereby reducing the throughput of the network.

An AP and the STAs connected to the AP are referred to as a basic service set (BSS). Oftentimes, the coverage areas associated with multiple BSSs will overlap, and therefore a STA may roam from one BSS to another. In some cases, a STA monitors the received signal strength (RSSI) or signal-to-noise ratio (SNR) of a beacon or packet received from an AP, and if the RSSI or SNR fall below a threshold value, the STA initiates a roaming scan. If the STA identifies a preferred BSS during the roaming scan the STA is handed over from the current BSS to the preferred BSS. This roaming technique, however, tends to favor "sticky" connections with the AP. For instance, the connection data performance (e.g., throughput) of a network can decrease due to factors other than a poor RSSI or SNR. Without observing a drop in the RSSI or the SNR, the STA remains attached to the low-performing network even though APs with better throughput on other channels may be available, resulting in an unnecessary reduction of STA throughput and user experience.

SUMMARY

The present description discloses techniques for congestion-based roaming in a WLAN. According to these techniques, a wireless communication device determines whether a shared channel is congested by monitoring traffic over the shared channel, calculates a congestion metric based at least in part on the monitoring, and triggers a roaming scan based at least in part on the calculated congestion metric. The calculated congestion metric can be an instantaneous congestion level, an average back-off window, a channel access time, or other parameter indicative of network congestion. If the calculated metric satisfies a roaming scan threshold, the device triggers a roaming scan of other shared channels.

The present description also discloses techniques for a wireless communication device to select a target shared channel or network for roaming. According to these techniques, the device monitors and calculates congestion metrics for a number of candidate channels identified in a roaming scan based at least in part on energy measured over the candidate channels, then roams to an AP of one of the candidate channels selected based at least in part on the calculated congestion metrics.

A method for wireless communications is described. The method includes performing, by a wireless station, a roaming scan to identify a candidate channel; calculating a congestion metric associated with traffic over the candidate channel corresponding to a plurality of wireless stations in a basic service set (BSS), wherein the congestion metric is based at least in part on an amount of energy measured over the candidate channel; and roaming to an AP associated with the candidate channel based at least in part on the calculated congestion metric. Performing the roaming scan oftentimes includes scanning a plurality of candidate channels.

The method can also include calculating the congestion metric independently of content of WLAN packets transmitted over the candidate channel. The congestion metric can be an instantaneous congestion level calculated during a clear channel assessment by the wireless station. The method can also include determining a received signal strength indication (RSSI) of the candidate channel. Roaming to the AP associated with the candidate channel can be further based at least in part on the RSSI of the candidate channel. The method can also include comparing the calculated congestion metric of the candidate channel with a roaming threshold. Roaming to the AP associated with the candidate channel can be based at least in part on the comparison.

The roaming threshold can be based at least in part on a congestion level associated with a current channel of the wireless station. In some cases, the roaming threshold is lower than the congestion level associated with the current channel of the wireless station. The method can also include storing congestion information associated with the candidate channel. Performing the roaming scan can be based at least in part on the stored congestion information.

Another apparatus for wireless communication includes a processor to perform, by a wireless station, a roaming scan to identify a candidate channel; calculate a congestion metric associated with traffic over the candidate channel corresponding to a plurality of wireless stations in a BSS, wherein the congestion metric is based at least in part on an amount of energy measured over the candidate channel; and roam to an AP associated with the candidate channel based at least in part on the calculated congestion metric. The apparatus can also implement additional aspects such as those described in the method above.

Yet another apparatus for wireless communication includes means for performing, by a wireless station, a roaming scan to identify a candidate channel; means for calculating a congestion metric associated with traffic over the candidate channel corresponding to a plurality of wireless stations in a BSS, wherein the congestion metric is based at least in part on an amount of energy measured over the candidate channel; and means for roaming to an AP associated with the candidate channel based at least in part on the calculated congestion metric. The apparatus can implement additional aspects such as those described in the method above.

A non-transitory computer-readable medium storing code for wireless communication at a wireless station is disclosed. The code includes instructions executable to cause a communication device to: perform, by a wireless station, a roaming scan to identify a candidate channel; calculate a congestion metric associated with traffic over the candidate channel corresponding to a plurality of wireless stations in a BSS, wherein the congestion metric is based at least in part on an amount of energy measured over the candidate channel; and roam to an AP associated with the candidate channel based at least in part on the calculated congestion metric. The code can cause the communication device to implement additional aspects such as those described in the method above.

Some examples of the methods, apparatuses, or non-transitory computer-readable media described herein may further include processes, features, means, or instructions for congestion based roaming in a WLAN. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
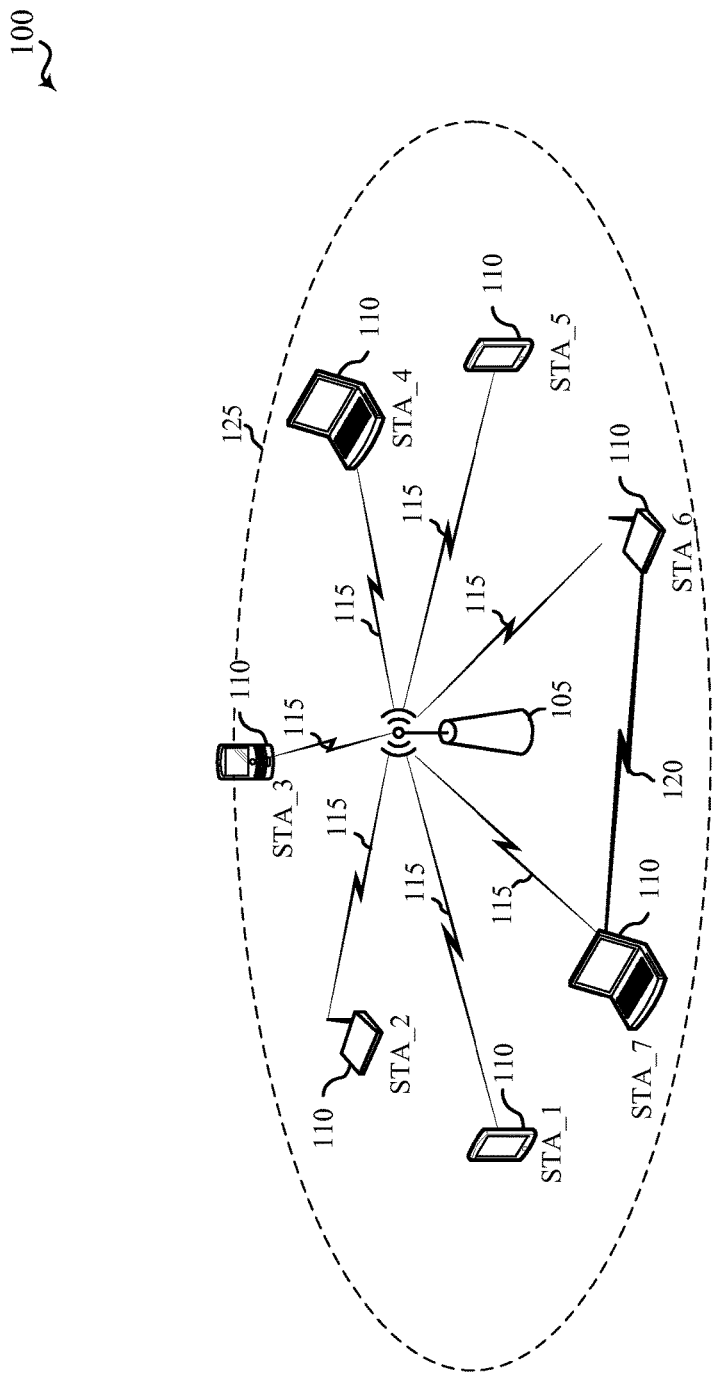
FIG. 1 illustrates an example of a network, such as a WLAN, that supports congestion based roaming in a WLAN in accordance with various aspects of the present disclosure.

According to the present disclosure, a communication device, such as a wireless station (STA), utilizes enhanced roaming techniques to trigger a roaming scan and to identify a candidate channel for roaming. Aspects of the disclosure are described in the context of a STA in a wireless local area network (WLAN). For example, a STA that is operating on a congested channel determines that the channel is congested using enhanced congestion level detection techniques. After determining the current channel is congested, the STA triggers a roaming scan to search for and identify alternative channels that are roaming candidates. The STA can use similar congestion metrics to select a candidate channel as a target for roaming after the roaming scan is initiated. The STA then roams to the selected candidate channel.

In one example, the STA monitors its current channel and calculates one or more congestion metrics based on the monitoring. The congestion metrics calculated by the STA may be one of or a combination of any of the following: an instantaneous congestion level of the current channel, an average back-off window duration for the current channel, a channel access time of the current channel, a collision rate of the current channel, the number of APs using the shared channel, the MAC buffer size, and other parameters indicative of channel congestion. One or more of the congestion metrics are compared to a roaming scan threshold to determine if the congestion level of the current channel is sufficiently high to prompt a roaming scan. If one of the congestion metrics satisfies the roaming scan threshold, the STA invokes a probabilistic function to determine whether the STA will proceed with a roaming scan. The likelihood that the STA proceeds with the roaming scan is based at least in part on the probability that the probabilistic function will return a given output. Utilizing the probabilistic function prevents a large number of STAs from simultaneously roaming away from a current channel at the same time.

During the roaming scan, the STA monitors a number of candidate channels and similarly calculates congestion metrics for one or more of the candidate channels. The congestion metric(s) calculated by the STA for a candidate channel may be one or more of the following metrics: an instantaneous congestion level of the candidate channel, a latency associated with a probe response on the candidate channel, a channel access time for the candidate channel, the number of APs using the candidate channel, or other metrics indicative of congestion that are observable prior to associating with an AP on the candidate channel. The STA selects one of the candidate channels based at least in part on the congestion metrics, an RSSI of the selected candidate channel, or a combination of the two, and roams to the selected candidate channel. These and other aspects of the disclosure are further illustrated by and described with reference to apparatus diagrams, system diagrams, and flowcharts.

FIG. 1 illustrates an example of a network, such as a WLAN 100, that supports congestion based roaming in a WLAN in accordance with various aspects of the present disclosure. The WLAN 100 includes an access point (AP) 105 and STAs 110 labeled as STA_1 through STA_7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 may have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 may be stationary or mobile.

Although not shown in FIG. 1, a STA 110 can be covered by more than one AP 105 and can therefore associate with multiple APs 105 at different times. A single AP 105 and an associated set of STAs is referred to as a basic service set (BSS). An extended service set (ESS) is a set of connected BSSs. A distribution system (DS) (not shown) is used to connect APs 105 in an extended service set. A coverage area 125 for an AP 105 can be divided into sectors making up only a portion of the coverage area (not shown). The WLAN 100 includes APs 105 of different types (e.g., metropolitan area, home network, etc.), with varying sizes of coverage areas and overlapping coverage areas for different technologies. Although not shown, other devices can communicate with the AP 105.

While the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. Examples of direct wireless communication links 120 include Wi-Fi Direct connections, connections established by using a Wi-Fi Tunneled Direct Link Setup (TDLS) link, and other peer-to-peer (P2P) group connections.

The STAs 110 and APs 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, etc. Thus, WLAN 100 implements a contention-based protocol that allows a number of devices (e.g., STAs 110 and APs 105) to share the same wireless medium (e.g., a channel) without pre-coordination. To prevent several devices from transmitting over the channel at the same time each device in a BSS operates according to certain procedures that structure and organize medium access, thereby preventing interference between the devices. However, as an increasing number of STAs 110 are associated with the BSS (i.e., as the network becomes more congested) the probability of collisions between STAs 110 increases.

Defined roaming policies control when the STAs 110 move between APs 105 and BSSs operating on different channels. Under one roaming policy, a STA 110 monitors the received signal strength (RSSI) or signal-to-noise ratio (SNR) of a beacon (or sometimes of a packet) from the AP 105 on a current channel, and if the RSSI or SNR fall below a threshold value, the STA 110 initiates a roaming scan. Use of this roaming technique alone, however, can lead to the STA 110 maintaining a "sticky" or persistent connection to an AP 105 even when AP 105 is experiencing congestion and unable to service the STA 110 as well as another AP 105 on a different channel. For instance, the connection data performance (e.g., throughput) of the current AP 105 may degrade due to several factors, such as medium congestion, medium collisions, etc., while the RSSI or SNR remain above the threshold triggering a roaming scan.

To address this issue, the STA 110 incorporates additional congestion-based metrics into the decision of when to perform a roaming scan. Under this roaming policy, the STA 110 monitors traffic associated with the current BSS on the current channel, calculates a congestion metric for the current channel or BSS based at least in part on the monitoring, and triggers a roaming scan based at least in part on the calculated congestion metric. The calculated congestion metric can be an instantaneous congestion level, an average back-off window, a channel access time, or another metric correlated with or otherwise indicative of a congestion level of the current channel. The STA 110 compares the calculated congestion metric(s) of the current with a roaming scan threshold and triggers a roaming scan based at least in part on whether the calculated congestion metric(s) satisfy the roaming scan threshold. When a roaming scan is triggered, the STA 110 identifies candidate channels and similarly calculates congestion metrics for the identified candidate channels. The STA 110 selects one of the candidate channels as a roaming target based at least in part on the calculated congestion metrics, and roams to an AP of the selected candidate channel.

Figure 2:
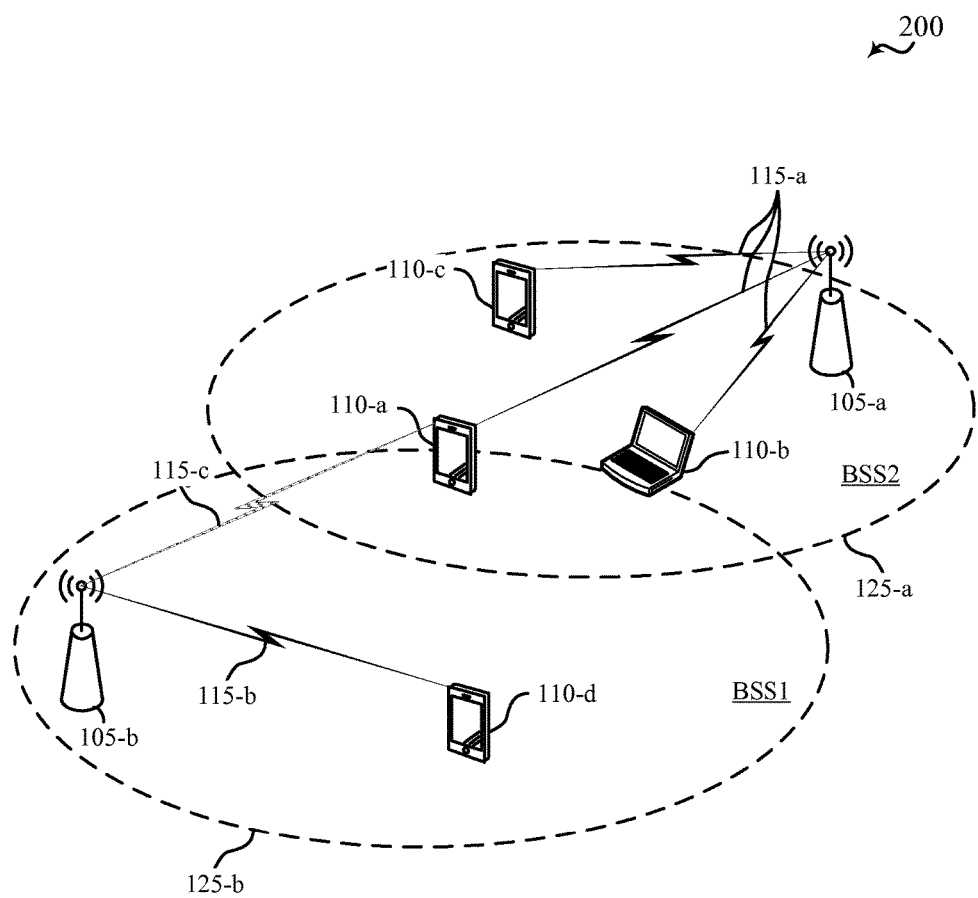
FIG. 2 illustrates an example of a wireless communication subsystem that supports congestion based roaming in a WLAN in accordance with various aspects of the present disclosure.

FIG. 2 illustrates one example of wireless communications subsystem 200 that supports congestion based roaming in a WLAN in accordance with various aspects of the present disclosure. Wireless communications subsystem 200 includes STAs 110-a to 110-d, and APs 105-a and 105-b, which are respective examples of the STA 110 and AP 105 of FIG. 1. In this example, STA 110-a to 110-c associate and communicate with AP 105-a. STAs 110-a to 110-c and AP 105-a are an example of a congested network (i.e., BSS_1); while STA 110-d is associates and communicates with AP 105-b as an example of a clear network (i.e., BSS_2). Furthermore, STA 110-a operates as an enhanced STA and is capable of performing enhanced roaming techniques.

STA 110-a monitors traffic from the other devices associated with BSS_1 that are communicating over the shared channel. STA 110-a then calculates one or more of the following congestion metrics for the shared channel: the instantaneous congestion level of the shared channel, the average back-off window, the channel access time associated with a transmission, the observed collision rate, the number of APs using the shared channel, and/or a MAC buffer size.

The instantaneous congestion level of the shared channel is determined by measuring the transmission activity over the shared channel during a clear channel assessment (CCA). Typically, heavy activity (as indicated by carrier sense and energy detect activities during the CCA) are correlated with a loaded channel and a congested network. For instance, the instantaneous congestion level may be based on the portion of an awake interval during which TX/RX activity takes place.

STA 110-a also keeps track of prior back-off window durations observed by STA 110-a and develops an average of the duration over time. The back-off window used by the STA 110-a during transmission opportunities is a function of collisions observed on the channel during contention for access to the channel. Therefore, a longer average back-off window for the STA 110-a on the channel correlates with more congestion over the channel and the network.

The channel access time is the amount of time that elapses between when data is placed in a transmit queue and when that data is transmitted over the channel. The STA 110-a monitors the channel access time by maintaining timestamps or updating timers as data is placed into transmit queues and transmitted over the channel. A longer channel access time is indicative of more congestion on the channel and the network.

The observed collision rate is determined by STA 110-a monitoring block acknowledgement failure rates, which correspond to transmissions that were sent but not received at STA 110-a due to interference from another STA. The number of APs using the same shared channel can additionally be an indicator that there is high traffic use in the area as each AP can be associated with multiple STAs.

MAC buffer sizes tracked by the STA 110-a determine if a backlog of data is waiting for transmission. A backlog of data is often associated with failed attempts by STA 110-a to transmit over the shared channel. Large MAC buffer sizes can also indicate delayed channel access times. Thus, average MAC buffer sizes can be used in conjunction with or instead of average channel access times to channel congestion.

The observed channel congestion metrics or precursor data can be averaged over time to prevent bursty traffic or other congestion metrics from triggering false positives at STA 110-a. One way to average the congestion metrics is the application of a low pass filter to tracked channel congestion metrics or precursor data over time. The specific filtering parameters of the low pass filter are adjustable to implement varying degrees of sensitivity.

Each of the congestion metrics monitored by the STA 110-a has an associated roaming scan threshold indicating when the congestion on the channel or network is high enough for the STA 110-a to consider roaming to a different channel. The use of the roaming scan thresholds to trigger roaming scans by the STA 110-a is configurable to adapt to different circumstances. For instance, a roaming scan can be triggered based at least in part on a) any of one of the congestion metrics satisfying a single threshold, or b) any one congestion metric or a combination of congestion metrics satisfying a combined roaming scan threshold. In one example, a roaming scan threshold associated with a first congestion metric is set to be lower than the roaming scan threshold for a second congestion metric, where the first congestion metric is a more reliable indicator of channel congestion. In another example, a roaming scan threshold is associated with a combination of metrics, where if both metrics satisfy a certain threshold, that often is lower than the respective corresponding thresholds, the roaming scan will be triggered. Different STAs are associated with different roaming scan threshold configurations to enable groups of STAs to identify congested channel conditions at different times, thereby preventing a disproportionate number of STAs from simultaneously migrating to a different BSS.

STA 110-a is additionally capable of utilizing pattern recognition or contingencies between congestion metrics to identify elevated congestion levels. For instance certain relationships between metrics (e.g., a first metric being higher than a second, a second metric being higher than a first, etc.) are indicative of high congestion levels. Also certain patterns, such as successive peaks of a certain metric within a specified window, can indicate channel congestion.

Once one or more of the roaming scan thresholds is satisfied, STA 110-a invokes a probabilistic function to determine whether to trigger a roaming scan. The probabilistic function is a pseudorandom function with a total of two outputs. One of the outputs corresponds to a decision to trigger the roaming scan and the other of the outputs corresponds to a decision not to trigger the roaming scan. The probability of obtaining the output corresponding to the decision to trigger the roaming scan is a design parameter that can be static or dynamically adjusted according to network conditions. The use of the probabilistic function guards against multiple STAs roaming away from the congested network at the same time based on the same congestion metrics. If the output of the probabilistic function prevents the roaming scan from taking place, STA 110-a waits until another roaming scan threshold is satisfied before subsequently invoking the probabilistic function. In some cases, the probabilistic function is updated to increase the likelihood the probabilistic function will yield an output that triggers the roaming scan after a roaming scan has been prevented. In this example, the probabilistic function prompts STA 110-a to trigger the roaming scan in search of candidate channels. The procedure used to determine whether to trigger a roaming scan is discussed in more detail below.

During a roaming scan, STA 110-a scans a predefined band to identify candidate channels for roaming. STA 110-a monitors each identified candidate channel and performs additional congestion metric calculations to determine a set of one or more congestion metrics for each candidate channel. These congestion metrics are based on conditions and parameters that can be observed for each candidate channel without actually roaming to the candidate channel. STA 110-a calculates one or more of the following congestion metrics: an instantaneous congestion level of the candidate channel, a latency associated with a probe response on the candidate channel, a channel access time for the candidate channel, and the number of APs using the candidate channel. The calculated metrics for a candidate channel are determined using similar techniques as described in the discussion above. STA 110-a also transmits probe requests to an AP associated with a candidate channel and observes the duration between the request and a response from the AP. The longer the duration, the more likely the candidate AP is fielding high amounts of traffic. As above, averaging may be applied to any of the calculated metrics to more accurately characterize long-term characteristics of a candidate channel.

In some cases, STA 110-a determines a congestion level for a candidate channel without transmitting a WLAN packet, such as a probe request, to an AP or decoding WLAN packets that are sent over a candidate channel. For instance, during a CCA, STA 110-a measures the energy over a candidate channel and uses the measured energy to infer a congestion level for the candidate channel. In one case, STA 110-a compares the measured energy with an energy threshold to determine if the candidate channel is congested. In another case, STA 110-a identifies the portion of the CCA period during which TX/RX activity takes place. In some cases, a larger identified portion relative to the CCA period reflects a higher likelihood that the candidate channel is congested. In this way, STA 110-a can determine congestion levels for a candidate channel without transmitting a WLAN packet, such as a probe request, to an AP that is associated with the candidate channel. Furthermore, STA 110-a may calculate congestion metrics without identifying the content of WLAN packets that are transmitted over the candidate channel. For instance, STA 110-a may determine whether a candidate channel is congested based on general band energy that is identified over the candidate channel. As above, averaging over time may be applied to the energy measurements to more accurately characterize long-term characteristics of the candidate channel.

STA 110-a compares the congestion metrics for each identified candidate channel with corresponding roaming thresholds to determine whether any of the identified candidate channels is too congested for roaming to be worthwhile. Similar to the roaming scan thresholds, the roaming thresholds can be specific to individual congestion metrics, groups of congestion metrics, or a combined threshold can be used. In one example, the roaming thresholds are set based on the technology used at the candidate AP. Thus, a candidate AP using a slower technology is associated with higher roaming thresholds so that STA 110-a is less likely to roam to a slower network. In other examples, the threshold associated with one metric may be set lower than the threshold associate with a second metric, thereby weighting certain congestion metrics over others. Different threshold values can also be set on a per-STA basis to differentiate groups of STAs. Certain combination of metrics, such as the combination of elevated probe response latency and increased channel access times can have a combined roaming threshold that is considerably lower than individual roaming thresholds for these metrics in isolation of each other. STA 110-a is also capable of modifying the thresholds based on the congestion levels measured at the current channel such that higher congestion levels at the current channel correspond to lower roaming thresholds for one or more of the congestion metrics.

As discussed earlier, BSS_2 of FIG. 2 represents a less-congested network than BSS_1. Therefore, during the roaming scan STA 110-a identifies that the congestion levels for the candidate channel associated with BSS_2 are low enough to satisfy a roaming threshold. STA 110-a also measures the RSSI associated with BSS_2 and determines that the RSSI is high enough to satisfy an RSSI threshold for roaming. STA 110-a compares the RSSI and congestion metrics for each candidate channel satisfying both thresholds, and selects a roaming target based at least in part on the candidate channel having the best possible combination of RSSI and congestion metric(s) (e.g., the candidate channel having the highest projected throughput based on the RSSI and congestion metric(s)). In some cases, STA 110-a sets the RSSI threshold to be lower based on the congestion levels measured at the current channel. For instance, if STA 110-a identifies that the current channel is significantly congested, the STA 110-a lowers the RSSI thresholds to assist STA 110-a in roaming to a new channel.

In this example, STA 110-a selects the candidate channel associated with BSS_2 as the target and roams to BSS_2 by associating with and connecting to AP 105-b. In some cases, STA 110-a is associated with multiple APs, including AP 105-b, prior to the roaming scan and does not need to associate with AP 105-b before connecting. After the roaming procedure is complete, AP 105-b and STA 110-a begin communicating via communication link 115-c. Additional details related to performing a roaming scan and roaming to a new channel are presented below. The foregoing provides just one example relating to congestion based roaming in a WLAN, and the techniques of the present disclosure are not limited to the discussion of this example. For instance, in other examples, no candidate channels are identified and STA 110-a remains connected within BSS_1.

Figure 3A:
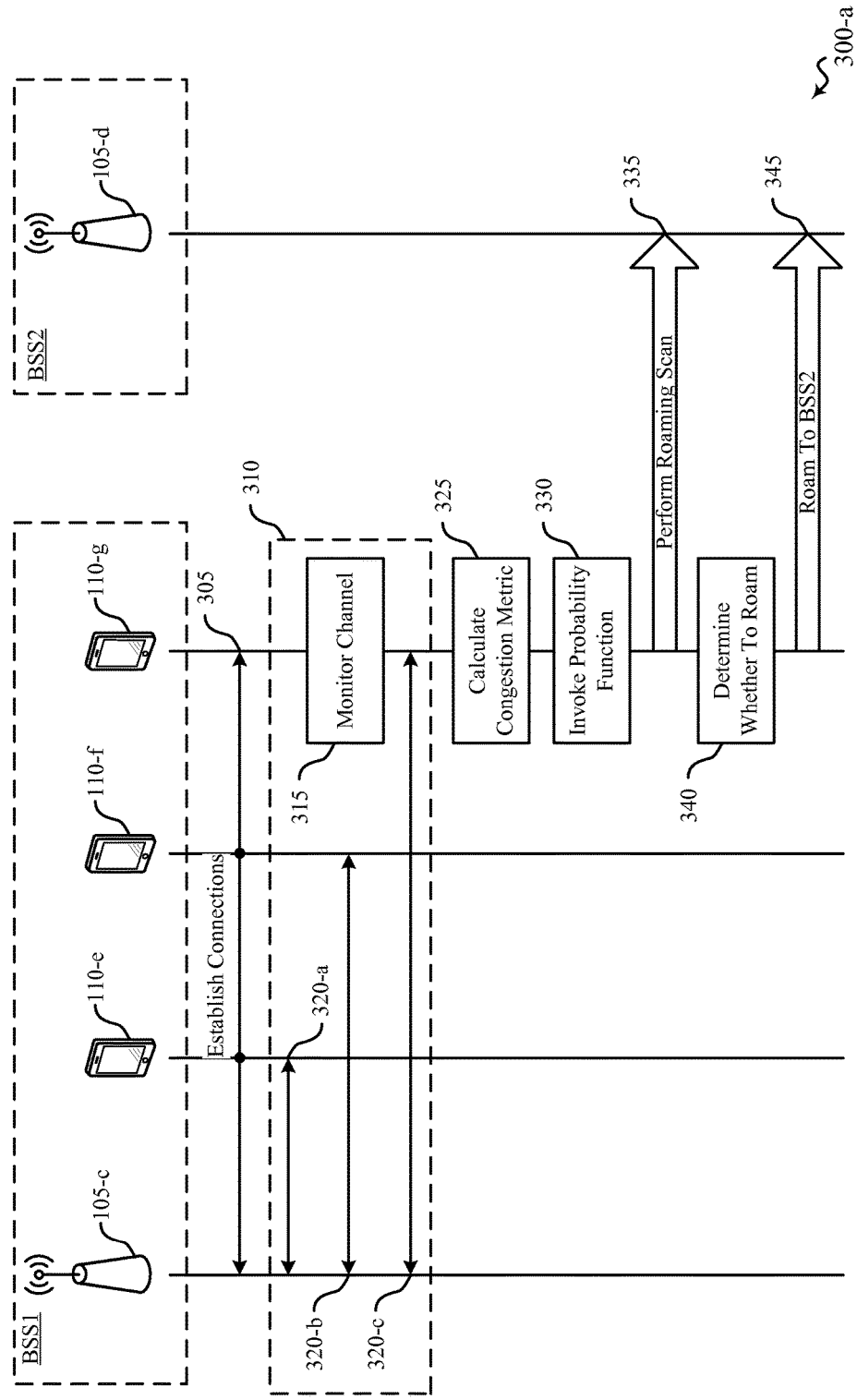
FIGS. 3A and 3B show process flows that illustrate examples of congestion based roaming in a WLAN in accordance with various aspects of the present disclosure.

FIG. 3A shows a process flow 300-a that illustrates one example of congestion based roaming in a WLAN in a wireless communications system including STAs 110-e to 110-g and APs 105-c and 105-d. APs 105-c and 105-d are associated with different BSSs (BSS1 and BSS2, respectively) and communicate over different channels. STA 110-e to 110-g and APs 105-c and 105-d are respective examples of the STAs 110 and APs 105 described above with reference to FIGS. 1-2. In this example, STA 110-g is capable of using enhanced roaming techniques to determine the current BSS (i.e., BSS_1) is congested and trigger a roaming scan to search for and roam to a less congested BSS (e.g., BSS_2).

At block 305, STAs 110-e to 110-g establish a connection with AP 105-c. In some cases, the STAs are already associated with AP 105-c, while in other cases, establishing a connection includes associating with AP 105-c. These device make up BSS_1, which is an example of a congested network, and can communicate with AP 105-c over shared channel 310. Additional APs, such as AP 105-d, can have a coverage area that overlaps with BSS_1 and are within range of and accessible to STAs within BSS_1. Accordingly, STA 110-g can be simultaneously associated with both AP 105-c or AP 105-d, while connected to AP 105-c.

At block 315, STA 110-g monitors the traffic associated with the other devices within BSS_1 over shared channel 310. Concurrently with the monitoring, STAs 110-e, 110-f, and 110-g engage in communications 320-a, 320-b, and 320-c with AP 105-c over the shared channel.

At block 325, STA 110-g calculates multiple congestion metrics based at least in part on the channel information collected during the monitoring. For instance, STA 110-g can calculate one or more of the following: the instantaneous congestion level over the shared channel during a clear channel assessment (CCA), the observed average back-off window, the observed channel access time associated with a transmission, the observed collision rate, the number of APs using the shared channel, or a MAC buffer size. In some cases, STA 110-g calculates one congestion metric, while in other cases, any combination of the congestion metrics can be calculated. STA 110-g then compares the calculated congestion metrics with a corresponding roaming scan threshold. The roaming scan threshold can be set lower or higher for different congestion metrics based at least in part on a desired outcome (e.g., to enable more or less aggressive roaming). In this example, the congestion metrics associated with BSS_1 satisfy the roaming scan threshold.

At block 330, STA 110-g invokes a probabilistic function based at least in part on determining that a calculated congestion metric or a combination of calculated congestion metrics have satisfied the roaming scan threshold. The probabilistic function, when executed, determines whether STA 110-g will trigger a roaming scan. In one example, the probabilistic function provides STA 110-g with a 70% likelihood of triggering a roaming scan after a roaming scan threshold has been met. The probabilistic function may be implemented as a probabilistic based number generator that outputs '1's and '0's, wherein STA 110-g triggers a roaming scan if the output is a '1'. Utilizing probabilistic functions prevents a large number of STAs from roaming away from the same BSS simultaneously. In this example, the probabilistic function yields an output that prompts STA 110-g to perform a roaming scan.

At block 335, STA 110-g performs a roaming scan during which STA 110-g analyzes multiple channels other than the current channel. At block 340, STA 110-g determines whether a scanned channel satisfies the roaming criteria and compares the identified candidate channels against one other. In this example, STA 110-g determines that BSS_2 is the preferred candidate channel. At block 345, STA 110-g roams to BSS_2 and associates with and/or connects to AP 105-d. The roaming procedure will be described in more detail in the discussions that follow.

Alternative examples of the foregoing may be implemented, in which certain blocks are performed in a different order or not at all. Some implementations may include additional features and steps beyond what is shown in FIG. 3A. For example, if the output of the probabilistic function does not trigger the roaming scan, STA 110-g may continue to monitor the channel and the calculated congestion metrics until the roaming scan threshold is again satisfied. STA 110-g may then invoke the probabilistic function and determine whether the roaming scan is triggered.

Figure 3B:
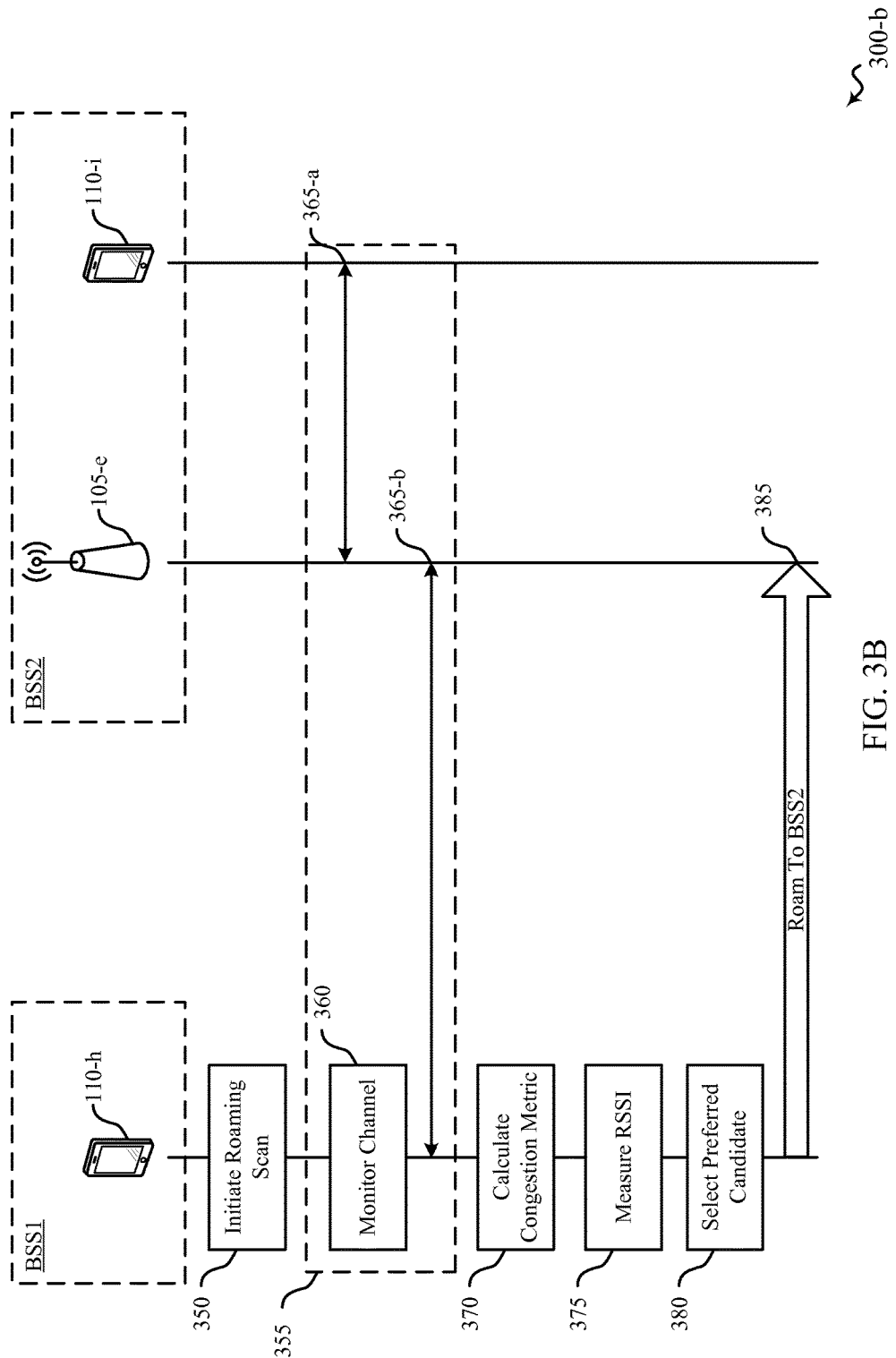

FIG. 3B shows a process flow 300-b that illustrates one example of congestion based roaming in a WLAN in a wireless communications system including STAs 110-*h* and 110-*i* and AP 105-*e*. STAs 110-*h* and 110-*i* and AP 105-*e* are respective examples of the STAs 110 and APs 105 described above with reference to FIGS. 1-3A. In this example, STA 110-*h* is capable of using enhanced roaming techniques. STA 110-*h* initiates a roaming scan procedure during which STA 110-*h* monitors and analyzes congestion metrics for multiple candidate channels. STA 110-*h* then selects one of the candidate channels and roams to the selected candidate channel (e.g., BSS_2).

At block 350, STA 110-*h* initiates a roaming scan to search for a less congested channel. The roaming scan can be triggered as described in FIG. 3A. During the roaming scan, STA 110-*h* will monitor multiple channels to identify a preferred candidate channel for roaming.

At block 360, STA 110-*h* monitors the candidate channel 355 that corresponds to BSS_2. Concurrently with the monitoring, STAs 110-*h* and 110-*i* engage in communications 365-*a* and 365-*b* with AP 105-*e* over the shared channel. In some cases, communication 365-*b* is a probe request/response between AP 105-*e* and STA 110-*h*. In other cases, STA 110-*h* refrains from sending communication 365-*b* to AP 105-*e*. Monitoring the channel includes measuring the energy that is detected over the candidate channel.

At block 370, STA 110-*h* calculates multiple congestion metrics based at least in part on the channel information collected during the monitoring. For instance, STA 110-*h* can calculate one or more of the following: the instantaneous congestion level over the shared channel during a CCA, the latency associated with a probe response from AP 105-*e*, the observed channel access time associated with a transmission, or the number of APs using the shared channel. In some cases, STA 110-*h* calculates one congestion metric, while in other cases, any combination of the congestion metrics are calculated. In yet other cases, STA 110-*h* determines the congestion metric over a candidate channel without transmitting a WLAN communication by measuring energy over the candidate channel during a CCA. In some cases, STA 110-*h* calculates the congestion metric independently from the content of the WLAN packets that are transmitted over the candidate channel. In this way, STA 110-*h* can determine a congestion metric based at least in part on the energy over a candidate channel without also receiving and decoding the WLAN packets that are transmitted over the candidate channel. STA 110-*h* then compares the calculated congestion metrics with a corresponding roaming threshold. STA 110-*h* sets the roaming threshold to be lower or higher for different congestion metrics based at least in part on a desired outcome or on the congestion level associated with the current channel (e.g., BSS_1). In this case, the roaming threshold is set to be lower than the congestion level associated with BSS_1, and one or more of the congestion metrics associated with BSS_2 satisfy the roaming threshold.

At block 375, STA 110-*h* measures the RSSI associated with candidate channel 355 based at least in part on determining that a calculated congestion metric or a combination of calculated congestion metrics have satisfied the roaming threshold. STA 110-*h* compares the measured RSSI of candidate channel 355 with an RSSI threshold to determine whether the scanned channel is a possible target for roaming. In this example, the RSSI roaming threshold is set lower than the normal RSSI threshold used for RSSI based roaming, and the RSSI associated with BSS_2 satisfies the RSSI threshold. Therefore, STA 110-*h* determines that BSS_2 is a possible target for roaming. STA 110-*h* similarly scans other shared channels and can develop a list of candidate channels for roaming.

At block 380, STA 110-*h* compares the channels that are candidates for roaming based at least in part on the calculated congestion metrics and measured RSSI. In this example, candidate channel 355 of BSS_2 is identified selected as the target for roaming. At block 385, STA 110-*h* roams to BSS_2 and associates with and/or connects to AP 105-*e*. In some cases, no candidate channels may be available and STA 110-*h* will remain connected with BSS_1.

Alternative examples of the foregoing may be implemented, wherein certain steps are performed in a different order or not at all. Certain steps may additionally include additional features not mentioned above. For example, STA 110-*h* may not identify any candidate channels or may identify a candidate channel different than BSS_2 that is better suited for roaming. In this case, STA 110-*h* may wait for an additional roaming scan to be triggered before initiating the roaming scan procedure. In other cases, STA 110-*h* may not compare candidate channels but may select the first channel that is identified as a roaming candidate.

Figure 4A:
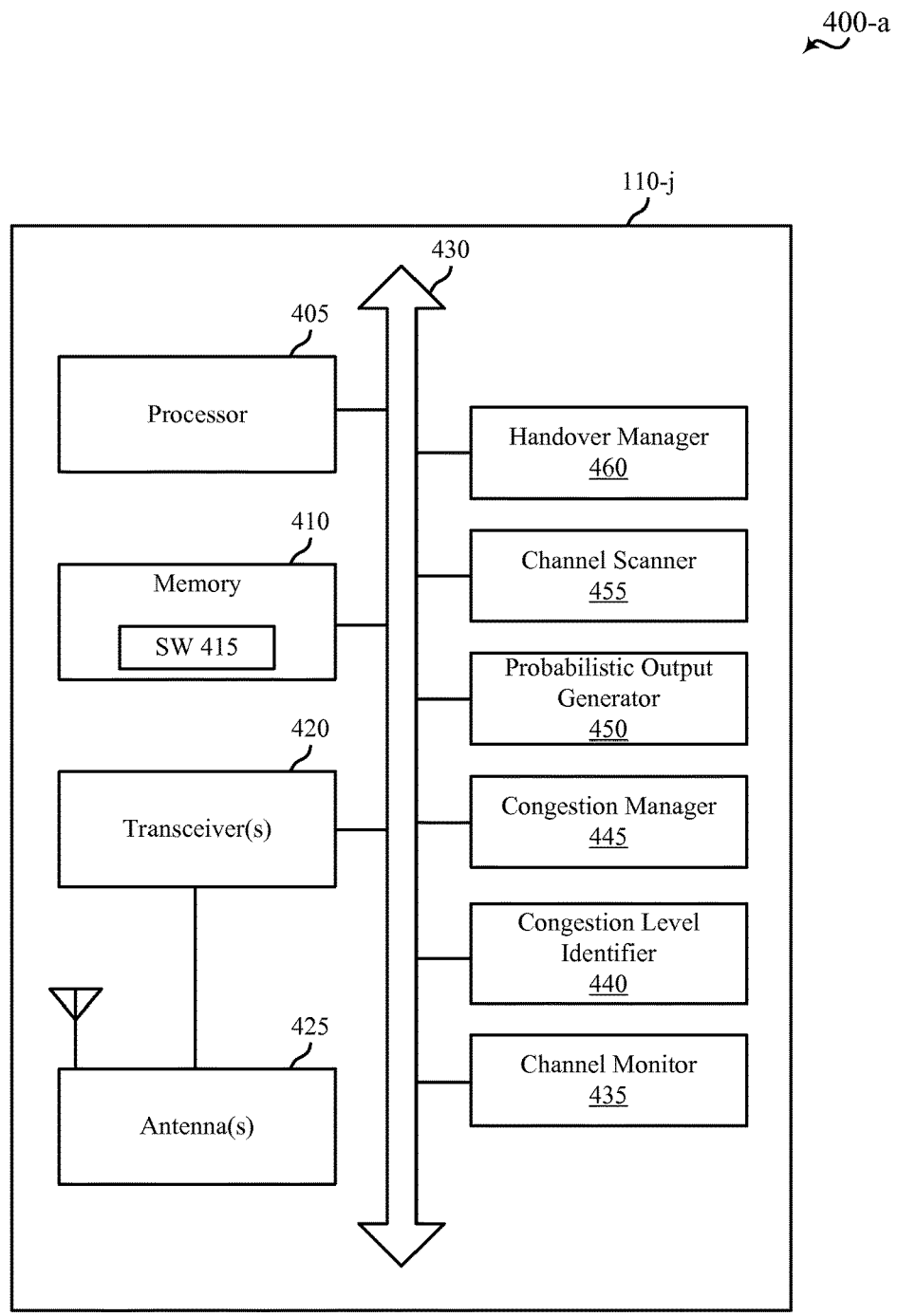
FIGS. 4A and 4B show block diagrams of examples of STAs that support congestion based roaming in a WLAN in accordance with various aspects of the present disclosure.

FIG. 4A shows a block diagram 400-*a* of an example STA 110-*j* that supports congestion based roaming in a WLAN in accordance with various aspects of the present disclosure, and with respect to FIGS. 1-3. The STA 110-*j* includes a processor 405, a memory 410, one or more transceivers 420, one or more antennas 425, a channel monitor 435, a congestion level identifier 440, a congestion manager 445, a probabilistic output generator 450, a channel scanner 455, and a roaming manager 460. The processor 405, memory 410, transceiver(s) 420, channel monitor 435, congestion level identifier 440, congestion manager 445, probabilistic output generator 450, channel scanner 455, and roaming manager 460 are communicatively coupled with a bus 430, which enables communication between these components. The antenna(s) 425 are communicatively coupled with the transceiver(s) 420.

The processor 405 is an intelligent hardware device, such as a central processing unit (CPU), a microcontroller, an application-specific integrated circuit (ASIC), etc. The processor 405 processes information received through the transceiver(s) 420 and information to be sent to the transceiver(s) 420 for transmission through the antenna(s) 425.

The memory 410 stores computer-readable, computer-executable software (SW) code 415 containing instructions that, when executed, cause the processor 405 or another one of the components of the STA 110-*j* to perform various functions described herein, for example, triggering a roaming scan and determining whether to roam to a different channel.

The transceiver(s) 420 communicate bi-directionally with other wireless devices, such as APs 105, STAs 110, or other devices. The transceiver(s) 420 include a modem to modulate packets and frames and provide the modulated packets to the antenna(s) 425 for transmission. The modem is additionally used to demodulate packets received from the antenna(s) 425.

The channel monitor 435, congestion level identifier 440, congestion manager 445, probabilistic output generator 450, channel scanner 455, and roaming manager 460 implement the features described with reference to FIGS. 1-3, as further explained below.

Again, FIG. 4A shows only one possible implementation of a device executing the features of FIGS. 1-3. While the components of FIG. 4A are shown as discrete hardware blocks (e.g., ASICs, field programmable gate arrays (FP- GAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 4A may be implemented by a single, consolidated hardware block. For example, a single transceiver 420 chip may implement the processor 405, memory 410, channel monitor 435, congestion level identifier 440, congestion manager 445, probabilistic output generator 450, channel scanner 455, and roaming manager 460.

Figure 4B:
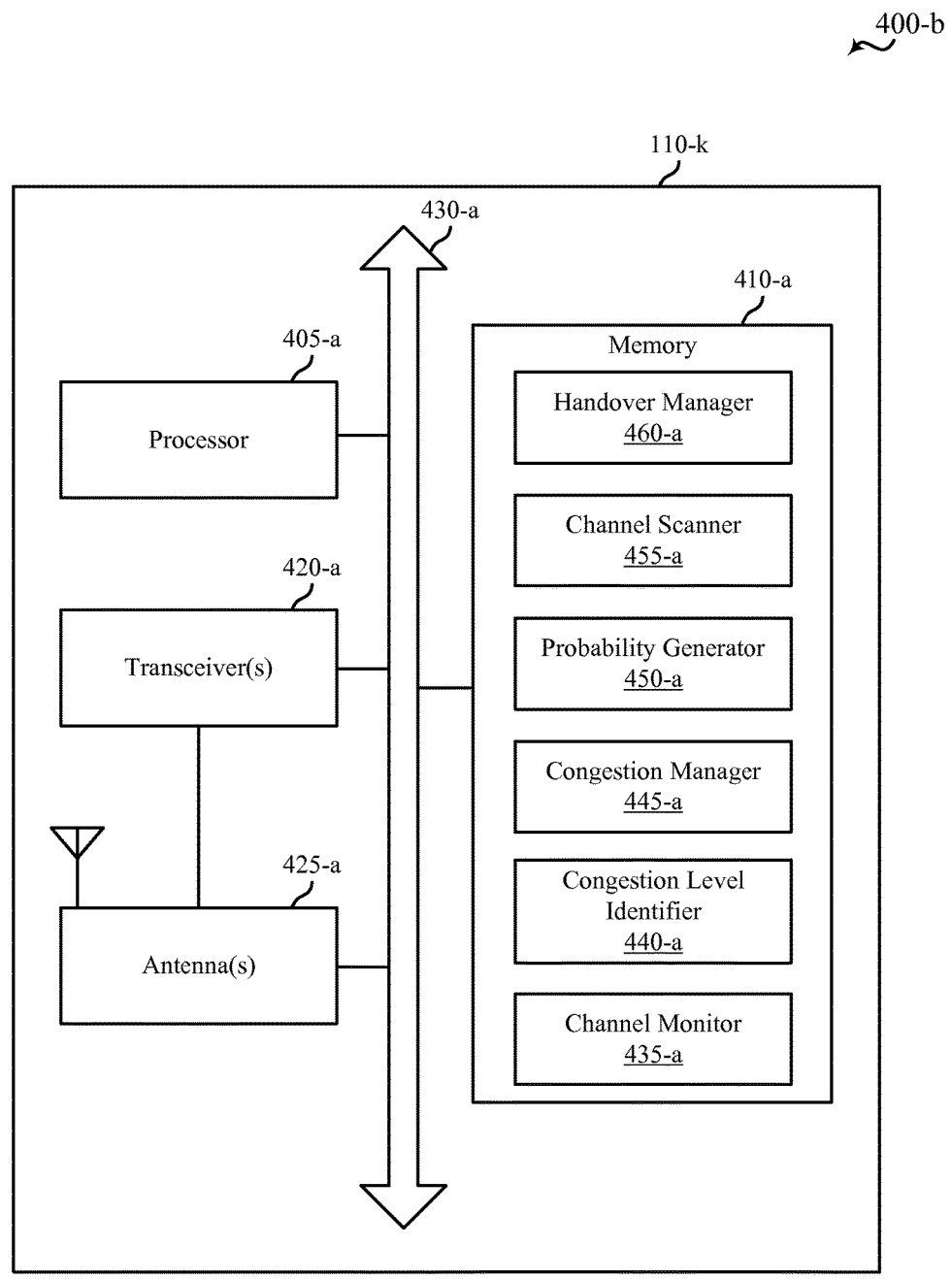

In still other examples, the features of each component may also be implemented, in whole or in part, with instructions embodied in a memory, formatted to be executed by one or more general or application-specific processors. For example, FIG. 4B shows a block diagram 400-b of another example of a STA 110-k in which the features of the channel monitor 435-a, the congestion level identifier 440-a, the congestion manager 445-a, the probabilistic output generator 450-a, the channel scanner 455-a, and the roaming manager 460-a are implemented as computer-readable code stored on memory 410-a and executed by one or more processors 405-a. Other combinations of hardware/software may be used to perform the features of one or more of the components of FIGS. 4A-4B.

Figure 5:
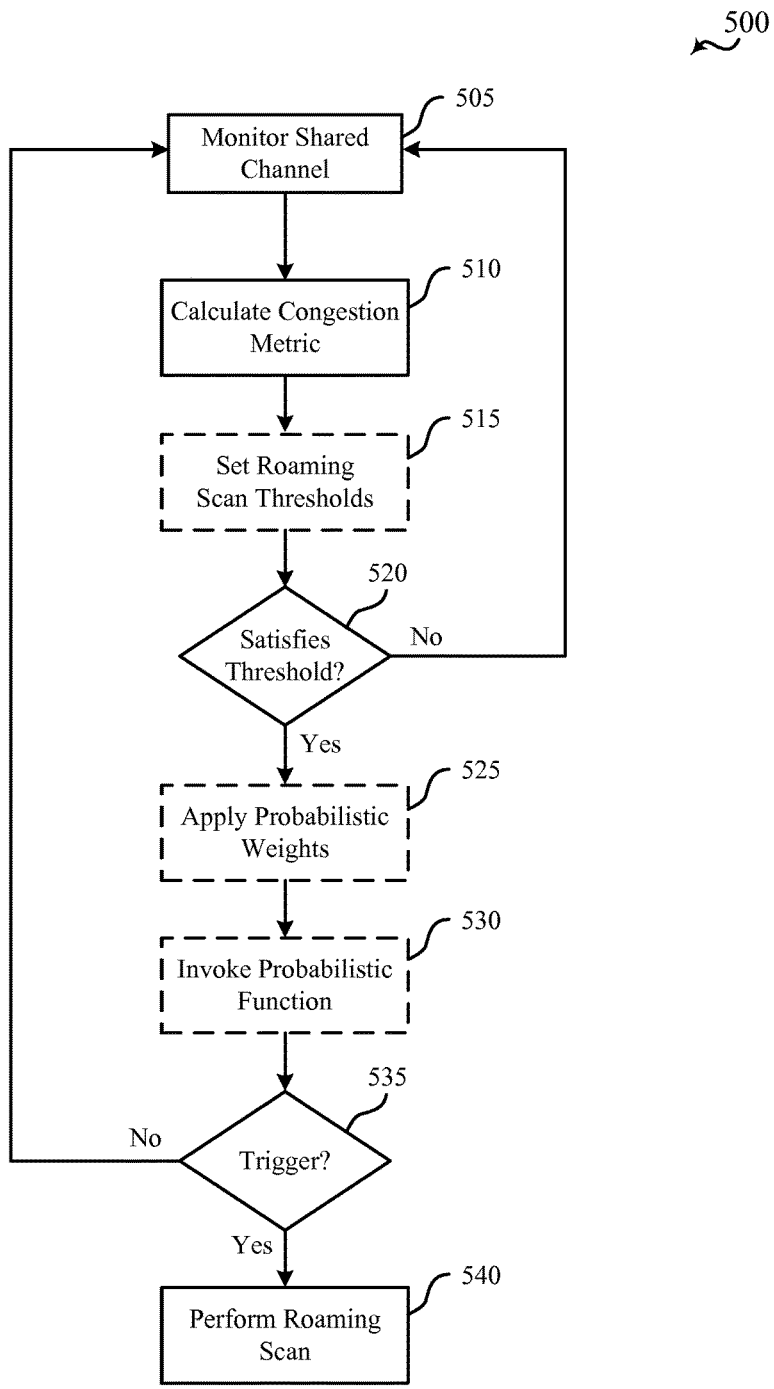
FIGS. 5 and 6 show flow charts that illustrate examples of methods for congestion based roaming in a WLAN in accordance with various aspects of the present disclosure.

FIG. 5 shows a flow chart that illustrates one example of a method 500 for wireless communication, in accordance with various aspects of the present disclosure. The method 500 may be performed by any of the STAs 110 discussed in the present disclosure, but for clarity the method 500 will be described from the perspective of the STAs 110-j and STA 110-k, of FIGS. 4A and 4B.

Broadly speaking, the method 500 illustrates a procedure by which the STA 110-j or 115-k monitors traffic over a shared channel associated with a current BSS, calculates congestion metrics associated with the BSS based at least in part on the monitored traffic, and triggers a roaming scan based at least in part on the calculated congestion metrics.

The method 500 begins with the STA 110-j or STA 110-k, operating in a congested network or BSS. At block 505, the channel monitor 435 monitors traffic that is associated with all of the devices within the current BSS. The channel monitor 435 can detect energy levels and receive and decode preambles and/or beacons associated with the other devices using the shared channel.

At block 510, the congestion level identifier 440 calculates a congestion metric associated with the traffic over the shared channel based at least in part the information collected during the monitoring. To calculate the congestion metric, the congestion level identifier 440 can do one or more of the following: measure the instantaneous congestion level during a CCA, determine the average back-off window duration for the STA 110-j or 115-k, observe the channel access time for the STA 110-j or 115-k, determine a collision rate, identify the number of APs using the shared channel, or monitor the MAC buffer size. In some cases, the congestion level identifier 440 monitors a block acknowledgement failure rate to determine the collision rate. The STA 110-j or 115-k can be configured so that the congestion level identifier 440 only calculates certain metrics or combinations of the set of metrics. The congestion level identifier 440 may further apply a low pass filter or other averaging techniques to the above metrics.

At block 515, the congestion level identifier 440 strategically sets the roaming scan thresholds. The roaming scan thresholds can be set differently per congestion metric or may be set per congestion metric combination. For instance, the threshold associated with a first congestion metric may be more easily satisfied than a threshold associated with a second congestion metric or combined thresholds can be utilized if a combination of metrics is used. Congestion metrics can be static or dynamically configurable to accommodate changing conditions. For instance, the STA 110-j or 115-k can update the roaming scan thresholds to favor more aggressive roaming if the congestion metric do not satisfy the thresholds in multiple attempts while throughput continues to fall.

At block 520, the congestion level identifier 440 determines whether the calculated congestion metrics satisfy the corresponding roaming scan thresholds. If the roaming scan thresholds are not satisfied, this indicates that the current channel is not sufficiently congested to prompt a roaming scan. Accordingly, the device continues to monitor the channel and flow returns to block 505.

At block 525, if one or more roaming thresholds are satisfied, the probabilistic output generator 450 applies probabilistic weights to a probabilistic function based at least in part on which congestion metric(s) have satisfied their corresponding roaming thresholds. Different probabilistic weights are associated with different calculated congestion metrics, which enables the STA 110-j or 115-k to emphasize certain congestion metrics over others and increases the likelihood that the congestion manager 445 will trigger a roaming scan if certain congestion metrics or combination of congestion metrics exceed their corresponding threshold. For instance, a first metric may be associated with a higher probabilistic weight (e.g., 80%) while a second metric may be associated with a lower probabilistic weight (e.g., 40%). The probabilistic output generator 450 can further associate a certain weight with a combination of metrics that exceed the roaming scan threshold. In other cases, the probabilistic output generator 450 chooses each weight to have the same value. Note that the probabilistic output generator 450 may be bypassed by setting each of the weights to 100%.

At block 530, the probabilistic output generator 450 invokes the probabilistic function based at least in part on the applied probabilistic weights. The probabilistic output generator 450 uses a random number generator, a probabilistic number generator, or other pseudorandom function to implement the probabilistic function. In some examples, the probabilistic function is weighted so that the congestion manager 445 is more or less likely to trigger a scan based at least in part on the applied probabilistic weight or the congestion of the network. For instance, the probabilistic output generator 450 may increase the likelihood that the probabilistic function will trigger a roaming scan if the congestion level is also high. As discussed above, utilizing the probabilistic function can prevent multiple STAs in a BSS from satisfying a roaming scan threshold and leaving the BSS simultaneously.

At block 535, the congestion manager 445 determines whether the output of the probabilistic output generator 450 triggers a roaming scan. If the output does not trigger the roaming scan, then flow returns to block 505, where the STA 110-j or 115-k continues to monitor the channel. Otherwise, if the output does trigger the roaming scan, the method continues to block 540, where the congestion manager 445 performs a roaming scan to search for a less congested network.

Figure 6:
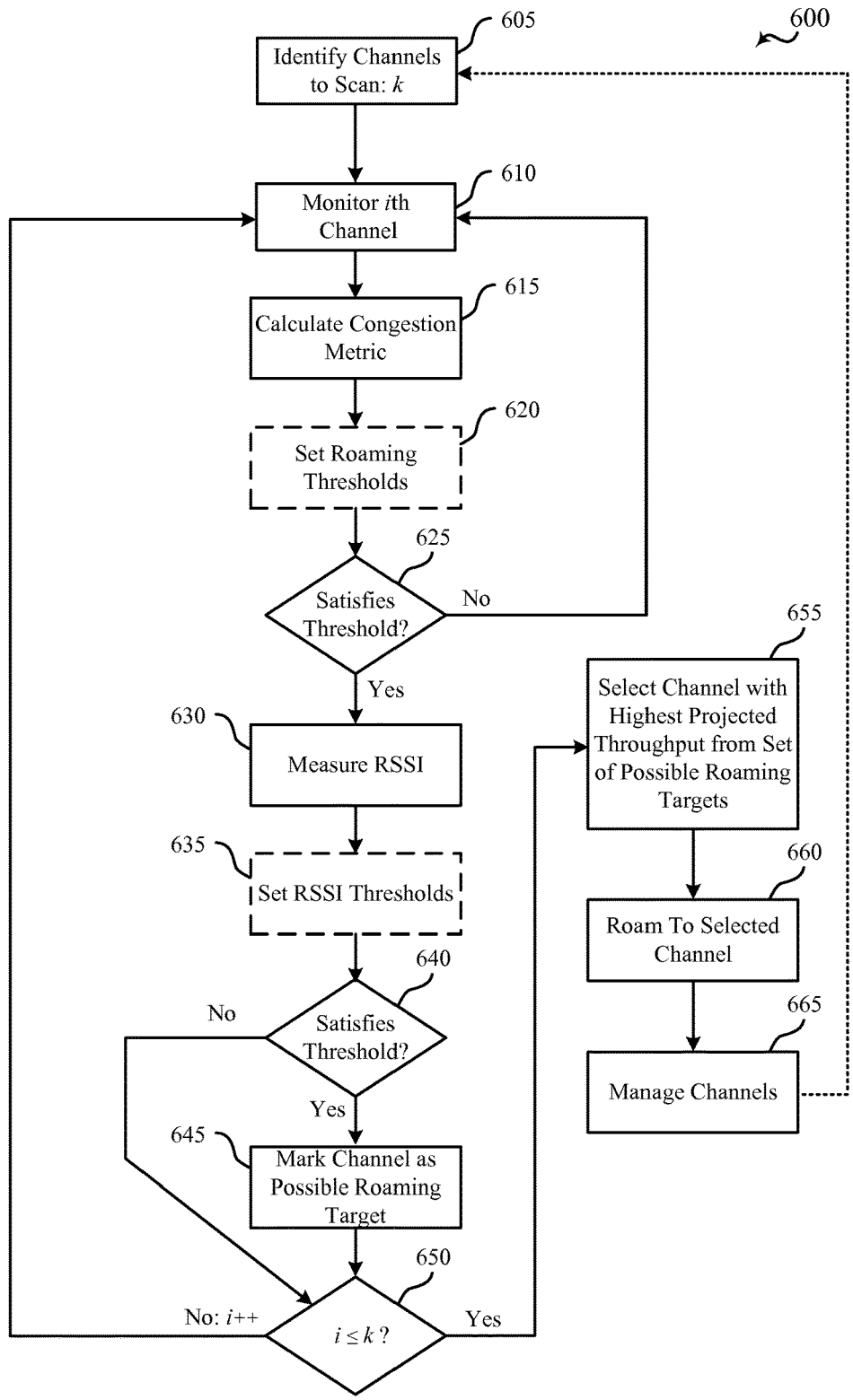

FIG. 6 shows a flow chart that illustrates one example of a method 600 for wireless communication, in accordance with various aspects of the present disclosure. The method 600 may be performed by any of the STAs 110 discussed in the present disclosure, but for clarity the method 600 will be described from the perspective of STAs 110-*j* and STA 110-*k*, of FIGS. 4A and 4B. Features disclosed in method 600 may be used alone or in combination with features from method 500.

Broadly speaking, the method 600 illustrates a procedure by which STA 110-*j* or STA 110-*k* performs a roaming scan to identify a candidate channel associated with a different BSS, calculates congestion metrics associated with the candidate channel to determine if the candidate channel is a suitable target for roaming, and roams to the candidate channel based at least in part on the calculated congestion metrics.

The method 600 begins with the STA 110-*j* or 115-*k* receiving an indication from the congestion manager 445 to trigger a roaming scan. At block 605, the channel scanner 455 identifies the total number of candidate channels, k, to be scanned. In some cases, the STA 110-*j* or 115-*k* determines that only a subset of channels, k, available will be scanned. At block 610, the channel monitor 435 monitors traffic that is associated with all of the devices within the scanned BSS. The channel monitor 435 can detect energy levels and receive and decode preambles, beacons, and/or probe responses associated with the other devices using the shared channel.

At block 615, the congestion level identifier 440 calculates a congestion metric associated with the traffic over the candidate channel based at least in part the information collected during the monitoring. For instance, the congestion level identifier 440 calculates the congestion metric based on an amount of energy that is measured over the candidate channel without transmitting a WLAN packet to an AP associated with the candidate channel (e.g., during a CCA) and independently of the content of WLAN packets transmitted over the candidate channel. In some cases, congestion level 440 calculates the congestion metric by doing one or more of the following: measuring the instantaneous congestion level during a CCA, measuring the latency associated with a probe response from an AP, observing the channel access time for the STA 110-*j* or 115-*k*, and/or identifying the number of APs using the candidate channel. The STA 110-*j* or 115-*k* is optionally configurable so that the congestion level identifier 440 only calculates certain metrics or combinations of the set of metrics. The congestion level identifier 440 can further apply a low pass filter or other averaging techniques to the above metrics.

At block 620, the congestion level identifier 440 strategically sets the roaming thresholds. The roaming thresholds may be set differently per congestion metric or may be set per congestion metric combination. For instance, the threshold associated with a first congestion metric can be more easily satisfied than a threshold associated with a second congestion metric or combined thresholds may be utilized if a combination of metrics is used. The congestion level identifier 440 may also dynamically update the roaming thresholds, e.g., setting the roaming threshold higher or lower based at least in part on the congestion level of the current BSS. In this case, the roaming threshold is set so that it is lower than the current congestion levels associated with the current BSS. In other cases, the thresholds can include memory based updates that cause the congestion level identifier 440 to set thresholds that favor more aggressive roaming after a number of failed attempts.

At block 625, the congestion level identifier 440 determines whether the calculated congestion metrics satisfy the corresponding roaming thresholds. If the roaming thresholds are not satisfied, this indicates to the STA 110-*j* or 115-*k* that the candidate channel is not a good target for roaming. Accordingly, the STA 110-*j* or 115-*k* continues to scan different channels and flow returns to block 610. If the roaming thresholds are satisfied than the method proceeds to block 630.

At block 630, the channel monitor 435 measures the RSSI of the candidate channel from a beacon sent from an AP associated with the candidate channel. At block 635, the channel monitor strategically sets the RSSI threshold. For instance, the RSSI threshold may be set higher or lower based at least in part on the congestion levels of the current BSS. In some cases, the RSSI threshold may be set lower than the standard RSSI threshold that is used to prompt the STA 110-*j* or 115-*k* to roam. In other cases, the RSSI threshold may be a predetermined value.

At block 640, the roaming manager 460 determines whether the measured RSSI exceeds the RSSI threshold. If the RSSI does not satisfy the RSSI threshold than the candidate channel is not considered a possible roaming target. The channel scanner 455 determines whether there are additional candidate channels to be scanned at block 650, and if additional channels remain the channel scanner 455 identifies the next channel to be scanned and proceeds from block 610. Otherwise, if the RSSI satisfies the RSSI threshold, at block 645 the roaming manager 460 marks the candidate channel as a possible roaming target. At block 650, the channel scanner 455 determines whether there are additional candidate channels to be scanned. If additional channels remain, the channel scanner 455 identifies the next candidate channel to be scanned and proceeds from block 610 otherwise the method proceeds to block 655. In some cases, the STA 110-*j* or 115-*k* foregoes scanning the remaining channel(s) and selects the first candidate channel that satisfies a certain set of criteria.

At block 655, the roaming manager 460 selects the candidate channel with the highest projected throughput from the set of possible roaming targets identified at block 645. The roaming manager 460 chooses the candidate channel with the highest projected throughput based on the congestion level of each candidate channel in the set, the RSSI of each candidate in the set, or from some combination of the two. At block 660, the roaming manager 460 prompts the STA 110-*j* or 115-*k* to roam to the selected candidate channel. Roaming to a selected candidate channel generally includes associating with the new AP prior to connecting. In other cases the STA 110-*j* or 115-*k* may already be associated with the AP and bypass the association procedures. At block 665, the roaming manager 460 manages the channels that are available for future roaming scans. In some cases, the roaming manager 460 updates the channels so that only the channels that have been determined to be the least congested are scanned or are scanned prior to the more congested channels. The roaming manager 460 can additionally maintain/store congestion information for the scanned channels for a set duration of time. The roaming manager 460 can further blacklist (e.g., prevent channels from being scanned) channels from future scans for a set duration of time. The roaming manager 460 communicates the channels to be scanned to channel scanner 455.

The methods 500 and 600 may provide for wireless communications at a STA or other communication device. It should be noted that these methods are just example implementations and that the operations of thereof may be rearranged or otherwise modified such that other implementations are possible. For example, aspects from the methods 500 and 600 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    performing, by a wireless station operating in a first channel, a roaming scan in response to determining that a first congestion level of the first channel is above a first threshold, wherein a value of a first received signal strength indicator (RSSI) for the first channel is above a second threshold for triggering roaming scans;
    identifying a plurality of candidate channels for roaming during the roaming scan;
    calculating a congestion metric for each candidate channel of the plurality of candidate channels, wherein a respective congestion metric for a respective candidate channel is calculated based at least in part on an amount of energy measured over each respective candidate channel and independently of a content of WLAN packets transmitted over the respective candidate channel;
    measuring a respective RSSI for each candidate channel of the plurality of candidate channels;
    determining that a value of a first congestion metric calculated for a first candidate channel is below a third threshold and a value of a second RSSI measured for the first candidate channel is above a fourth threshold;
    projecting that a throughput of the first candidate channel is higher than respective throughputs of each of the other candidate channels based at least in part on the value of the first congestion metric and the value of the second RSSI;
    selecting the first candidate channel from the plurality of candidate channels instead of the other candidate channels of the plurality of candidate channels for roaming based at least in part on the projection; and roaming to an access point (AP) associated with the first candidate channel wherein the value of the first RSSI for the first channel is above the second threshold.

2. The method of claim 1, wherein the congestion metric is an instantaneous congestion level calculated during a clear channel assessment by the wireless station.

3. The method of claim 1, further comprising:
determining the second RSSI of the first candidate channel, wherein roaming to the AP associated with the first candidate channel is further based at least in part on the second RSSI.

4. The method of claim 1, further comprising:
comparing the calculated congestion metric of the first candidate channel with the third threshold, wherein roaming to the AP associated with the first candidate channel is based at least in part on the comparison.

5. The method of claim 4, wherein the third threshold is based at least in part on a congestion level associated with the first channel.

6. The method of claim 5, wherein the roaming threshold is lower than the congestion level associated with the first channel.

7. The method of claim 1, wherein performing the roaming scan comprises scanning the plurality of candidate channels.

8. The method of claim 1, further comprising:
storing congestion information associated with the plurality of candidate channels, wherein performing the roaming scan is based at least in part on the stored congestion information.

9. A communication device operating in a first channel, comprising:
a channel scanner to perform a roaming scan in response to determining that a first congestion level of the first channel is above a first threshold, wherein a value of a first received signal strength indicator (RSSI) for the first channel is above a second threshold for triggering roaming scans;
the channel scanner being further configured to identify a plurality of candidate channels for roaming during the roaming scan;
a congestion level identifier to calculate a congestion metric for each candidate channel of the plurality of candidate channels, wherein a respective congestion metric for a respective candidate channel is calculated based at least in part on an amount of energy measured over each respective candidate channel and independently of a content of WLAN packets transmitted over the respective candidate channel;
a channel monitor to measure a respective RSSI for each candidate channel of the plurality of candidate channels;
the congestion level identifier being further configured to determine that a value of a first congestion metric calculated for a first candidate channel is below a third threshold and a value of a second RSSI measured for the first candidate channel is above a fourth threshold;
a roaming manager to project that a throughput of the first candidate channel is higher than respective throughputs of each of the other candidate channels based at least in part on the value of the first congestion metric and the value of the second RSSI; and
the roaming manager being further configured to select the first candidate channel from the plurality of candidate channels instead of the other candidate channels of the plurality of candidate channels for roaming based at least in part on the projection, and the roaming manager being further configured to roam to an access point (AP) associated with the first candidate channel wherein the value of the first RSSI for the first channel is above the second threshold.

10. The communication device of claim 9, wherein the congestion metric is an instantaneous congestion level calculated during a clear channel assessment by the communication device.

11. The communication device of claim 9, further comprising:
a channel monitor to determine the second RSSI of the first candidate channel, wherein the roaming manager is further configured to roam to the AP associated with the first candidate channel based at least in part on the second RSSI.

12. The communication device of claim 9, wherein the congestion level identifier is further configured to:
compare the calculated congestion metric of the first candidate channel with the third threshold, wherein the roaming manager is further configured to roam to the AP associated with the first candidate channel based at least in part on the comparison.

13. The communication device of claim 12, wherein the third threshold is based at least in part on a congestion level associated with the first channel.

14. The communication device of claim 13, wherein the roaming threshold is lower than the congestion level associated with the first channel.

15. The communication device of claim 9, wherein the channel scanner is further configured to:
perform the roaming scan over the plurality of candidate channels.

16. The communication device of claim 9, wherein
the roaming manager is further configured to store congestion information associated with the plurality of candidate channel channels, wherein the channel scanner is further configured to perform the roaming scan based at least in part on the stored congestion information.

17. A communication device operating in a first channel, comprising:
means for performing a roaming scan in response to determining that a first congestion level of the first channel is above a first threshold, wherein a value of a first received signal strength indicator (RSSI) for the first channel is above a second threshold for triggering roaming scans;
means for identifying a plurality of candidate channels for roaming during the roaming scan;
means for calculating a congestion metric for each candidate channel of the plurality of candidate channels, wherein a respective congestion metric for a respective candidate channel is calculated based at least in part on an amount of energy measured over each respective candidate channel and independently of a content of WLAN packets transmitted over the respective candidate channel;
means for measuring a respective RSSI for each candidate channel of the plurality of candidate channels;
means for determining that a value of a first congestion metric calculated for a first candidate channel is below a third threshold and a value of a second RSSI measured for the first candidate channel is above a fourth threshold;
means for projecting that a throughput of the first candidate channel is higher than respective throughputs of each of the other candidate channels based at least in part on the value of the first congestion metric and the value of the second RSSI;
means for selecting the first candidate channel from the plurality of candidate channels instead of the other candidate channels of the plurality of candidate channels for roaming based at least in part on the projection; and
means for roaming to an access point (AP) associated with the first candidate channel wherein the value of the first RSSI for the first channel is above the second threshold.

18. The communication device of claim 17, wherein the congestion metric is an instantaneous congestion level calculated during a clear channel assessment by the communication device.

19. The communication device of claim 17, further comprising:
means for determining the second RSSI of the first candidate channel, wherein roaming to the AP associated with the first candidate channel is further based at least in part on the second RSSI.

20. The communication device of claim 17, further comprising:
means for comparing the calculated congestion metric of the first candidate channel with a-reaming the third threshold, wherein roaming to the AP associated with the first candidate channel is based at least in part on the comparison.

21. The communication device of claim 20, wherein the third threshold is based at least in part on a congestion level associated with the first channel.

22. The communication device of claim 21, wherein the roaming threshold is lower than the congestion level associated with the first channel.

23. The communication device of claim 17, wherein the means for performing the roaming scan comprises a means for scanning the plurality of candidate channels.

24. The communication device of claim 17, further comprising:
means for storing congestion information associated with the plurality of candidate channels, wherein performing the roaming scan is based at least in part on the stored congestion information.

25. A non-transitory computer-readable medium storing code for wireless communication at a wireless station operating in a first channel, the code comprising instructions executable to cause a communication device to:
perform a roaming scan in response to determining that a first congestion level of the first channel is above a first threshold, wherein a value of a first received signal strength indicator (RSSI) for the first channel is above a second threshold for triggering roaming scans;
identify a plurality of candidate channels for roaming during the roaming scan;
calculate a congestion metric for each candidate channel of the plurality of candidate channels, wherein a respective congestion metric for a respective candidate channel is calculated based at least in part on an amount of energy measured over each respective candidate channel and independently of a content of WLAN packets transmitted over the respective candidate channel;
measure a respective RSSI for each candidate channel of the plurality of candidate channels;
determine that a value of a first congestion metric calculated for a first candidate channel is below a third threshold and a value of a second RSSI measured for the first candidate channel is above a fourth threshold;
project that a throughput of the first candidate channel is higher than respective throughputs of each of the other candidate channels based at least in part on the value of the first congestion metric and the value of the second RSSI;
select the first candidate channel from the plurality of candidate channels instead of the other candidate channels of the plurality of candidate channels for roaming based at least in part on the projection; and
roam to an access point (AP) associated with the first candidate channel wherein the value of the first RSSI for the first channel is above the second threshold.

26. The non-transitory computer-readable medium of claim 25, wherein the congestion metric is an instantaneous congestion level calculated during a clear channel assessment by the wireless station.

\* \* \* \* \*